United States Patent [19]
Chi et al.

[11] Patent Number: 5,147,045
[45] Date of Patent: Sep. 15, 1992

[54] PARTICULATE SEPARATIONS BY ELECTROSTATIC COALESCENCE

[75] Inventors: Sheng-Ming B. Chi, Pittsburgh; Robin R. Oder, Export, both of Pa.

[73] Assignee: Exportech Company, Inc., New Kensington, Pa.

[21] Appl. No.: 277,018

[22] Filed: Nov. 28, 1988

[51] Int. Cl.$^5$ .................. B03B 1/04; B03C 5/00; C10G 33/04
[52] U.S. Cl. ...................... 209/9; 44/624; 44/626; 44/627; 204/190; 204/302; 204/307; 208/187; 208/188; 209/127.1
[58] Field of Search .......... 209/9, 127.1, 131; 44/620-622, 624, 626, 627; 204/186, 188-190, 302, 305-307; 208/187, 188; 210/DIG. 5

[56] References Cited

U.S. PATENT DOCUMENTS

| | | | |
|---|---|---|---|
| 1,405,130 | 1/1922 | Harris | 204/189 X |
| 1,529,349 | 3/1925 | Eddy | 204/190 |
| 1,838,379 | 12/1931 | Fisher | 204/190 |
| 2,027,615 | 1/1936 | Prutzman | 204/188 |
| 2,447,529 | 8/1948 | Perkins, Jr. | 204/190 |
| 3,331,765 | 7/1967 | Canevari et al. | 208/11 |
| 3,582,527 | 6/1971 | Lucas | 204/302 |
| 4,226,689 | 10/1980 | Mayse et al. | 204/188 |
| 4,226,690 | 10/1980 | Martin | 204/190 |
| 4,252,631 | 2/1981 | Hovarongkura et al. | 204/188 X |
| 4,290,882 | 9/1981 | Dempsey | 204/190 X |
| 4,402,807 | 9/1983 | Merchant, Jr. | 204/190 |
| 4,511,452 | 4/1985 | Robinson | 204/190 X |
| 4,526,585 | 7/1985 | Burgess et al. | 44/627 X |
| 4,879,014 | 11/1989 | van Laar et al. | 204/190 |

FOREIGN PATENT DOCUMENTS

| | | | |
|---|---|---|---|
| 1556271 | 11/1968 | France | 204/306 |

OTHER PUBLICATIONS

Cooper et al., "The Relevance of "HLB" to De-Emulsification of a Mixture of Heavy Oil, Water and Clay", Canadian J. of Eng., vol. 58 Oct. 1980.

Menon, et al., "Characterization of Oil-Water Interfaces Containing Finely Divided Solids with Applications to the Coalescence of Water-In-Oil Emulsions: A Review, Colloids and Surfaces", vol. 29, No. 1, pp. 7-27.

Gelot, et al., "Emulsification of Oil and Water (1988), In the Presence of Finely Divided Solids and Surface-Active Agents, Colloids and Surfaces", vol. 12, pp. 271-303 (1984).

Primary Examiner—Kevin P. Shaver
Assistant Examiner—Edward M. Wacyra
Attorney, Agent, or Firm—Michael J. Kline

[57] ABSTRACT

The use of electrostatic demulsification methods to separate fine particulates of differing surface characteristics is disclosed. In one example, particles of hydrophobic coal and hydrophilic kaolin clay, each of nominal 3.5 micron mass mean particle diameter, were separated from a variety of stable water-in-oil emulsions. 50/50 blends of coal of 4% ash and kaolin clay of 86.5% ash were used in the experiments. A variety of oils, water concentrations, solids concentrations, and emulsifiers have been used in this work. Externally applied electrostatic fields up to 1.2 kV/cm were used. Greater than 90% rejection of kaolin particles into the separated water phase was achieved with virtually complete recovery of the coal particles uniformly suspended in the oil phase. Under conditions resulting in the most efficient separation, we have observed that the coalesced water phase appeared as intertwined cylindrical tubes extending between electrodes, as opposed to nonconnected and chained droplets which have been reported by others. The fine kaolin particulates were observed to be water-encased while most coal particles remained dispersed in the oil continuum.

40 Claims, 8 Drawing Sheets

FIG. 5a  Oil/ Water/ Emulsifier= 90/ 25/ 1.5

FIG. 5b  Oil/ Water/ Emulsifier= 90/ 15/ 1

FIG. 6-iii

FIG. 7-iii $\vdash\!\!\dashv$ 50μm

FIG. 7-iv $\vdash\!\!\dashv$ 50μm

PARTICULATE SEPARATIONS BY ELECTROSTATIC COALESCENCE

NOTICE OF GOVERNMENT CONTRACT CONCERNING THIS WORK

Some of the work for this disclosure was supported by a grant from the National Science Foundation, contract number ISI-87-01187 as part of its Phase II Small Business Innovation Research Programs.

FIELD OF THE INVENTION

The present invention relates to methods, apparatus, and compositions of matter for separating fine particulate matter and water from liquid hydrocarbon streams, particularly with the use of electrostatic coalescence.

BACKGROUND OF THE INVENTION

Several techniques are available for removing fine solid and liquid particulates from liquid hydrocarbon streams and various selection schemes have been investigated. Such separation depends primarily on particle surface characteristics and size distribution, specific gravity, electric and magnetic properties, concentration, liquid viscosity, liquid loss and cost. However, present technology is deficient in selective separation of moderate to high concentrations of very fine particles of mixed surface characteristics from hydrocarbon liquids with viscosities greater than 10 cp.

One method of interest is electrostatic coalescence. In comparison with other conventional separation technologies, such as filtration, sedimentation, hydrocycloning and centrifugation, electrostatic coalescence offers a low cost and simple operation. Electrostatic coalescence is used in the petroleum industry for dewatering and desalting of crude oil and for polishing distillates and highly refined products. In this method, emulsified water is used as a medium for absorbing the solids or other impurities to be removed. The electrostatic field causes the water to coalesce and the water and impurities are then separated by sedimentation. Present daily capacity of electrostatic desalters is over 8,000,000 barrels per day (bpd), with up to 4,000,000 bpd capacity for polishing operations.

The success of electrostatic coalescence in removing water and dissolved impurities from crude oil and petroleum products is highly sensitive to the choice of surfactants used to promote demulsification. The method is limited in its ability to remove all water and associated particulates from hydrocarbon liquids. Further, highly viscous crudes produced by steam injection contain significant amounts of emulsified water proving to be difficult to separate by conventional electrostatic methods. Additionally, the electrostatic method has not been successfully applied to breaking emulsions when the emulsions are stabilized by the presence of micron sized particulate matter. If the electrostatic method were applicable to handling emulsions containing high concentrations of solids, then the method could be extended to other applications of significance such as the recovery of hydrotreating and desulfurization catalysts such as zeolites or iron oxides from liquid hydrocarbon streams and to the processing of difficult to separate solids-stabilized emulsions which cause environmental problems in petroleum production and refining. In the synthetic fuels industry, the dispersion of water and fine mineral particles in oil necessitates the use of extensive oil-cleaning methods. Electrostatic coalesance has been investigated for dedusting of synthetic crudes such as coal liquefaction and shale retorting products. See L. A. Kaye and R. J. Fiocco, "Fine Particles Separations From NonAqueous Liquids," Separation Science and Technology, 19 (11 and 12), 794 (1984-85). The application of electrical coalescence to removal of dispersed water from coal-derived liquids has been discussed and the use of electrostatic coalescence methods for resolving emulsions made in some clean-up operations has been proposed.

An example of a significant problem of particulate separations occurs in the tar sands industry where very fine mineral particles must be removed from bitumen and other hydrophobic solids both in the recovery process and in the waste treatment stream. Electrostatic methods could potentially be used in these applications if efficient methods for selective separation of hydrophobic bitumen from hydrophilic mineral matter were available. Yet another example of a significant problem that might be addressed by electrostatic coalescense is that of separation of hydrophilic mineral matter from hydrophobic kerogen containing shale. Such beneficiation before retorting would improve the efficiency of conversion and greatly reduce the problems associated with removal of fine particulates from the shale oil.

Until now, it has been believed that electrostatic coalescence was associated with at least one of three types of behavior:

1. Chains of water droplets are formed, sometimes referred to as 'Type I behavior.' See S. E. Taylor, "Investigations into the Electrical and Coalescence Behavior of Water-in-Crude Oil Emulsions in High Voltage Gradients," Colloids and Surfaces, 29 (1988) 29-51. The electrical attraction between the positive and negative poles induced by the applied electric field causes the droplets to coalesce.

2. Coalescence can also occur under more chaotic conditions. This behavior is sometimes referred to as 'Type II behavior.' Under these conditions, each droplet exerts its own changing influence on the imposed field. Consequently, the position of each droplet and the electric field at every point fluctuate erratically. This causes the droplets to move about rapidly in random directions, which greatly increases the chances of coalescence.

3. Droplets are attracted to and collect on the electrodes forming larger and larger drops until eventually they fall by gravity.

The behavior of water-in-oil emulsions when subjected to high electric fields depends on the nature and quantity of the oil, water, and the presence of chemical additives in both water and oil phases, which subsequently affects the solubilities and the size and stability of water drops in the emulsion. Coalescence efficiency also depends on the method of emulsion preparation, the configuration of the electrodes and the operating conditions such as voltage, frequency, operation time, mechanical mixing, as well as the control of temperature and pH.

The handling of emulsions is greatly complicated by the presence of solid materials. Emulsions can be stabilized by the presence of solid or highly viscous matter at the interface of the two liquids. The removal of particles is affected by the surface characteristics of the solids and by the aqueous phase pH, high values of pH yielding better results. Further, fine sized particles have proven difficult to transfer into the water phase in the prior art. Emulsions containing micron sized particles are stable and have proven difficult to break, thus presenting a significant environmental problem in the petrochemical and alternative fuels industries.

While many problems of emulsion stability associated with the presence of fine particulates have been recognized prior to the work of this invention, there have been no successful attempts to separate solid particulates based on differences of surface characteristics when using electrostatic coalescence technology.

SUMMARY OF THE INVENTION

The present invention provides a new method of separating particulates which has not previously been attempted. The term "particulates," as used herein, refers to the dispersed phases of an emulsion that uses an organic liquid as a continuous phase. The particulates can be either micron sized solid particles, water droplets, dissolved solids, or even dissolved liquids/oils in water droplets. In the new method, particulates to be separated are mixed into an emulsion of water in an organic liquid such as oil. The emulsion provides a large surface area of water for selective adsorption of hydrophilic particulates, including water. The emulsion is then resolved into its liquid components with use of an electrostatic field. The resulting water and its associated particulates is then removed by settling. The hydrophobic particles not captured by water remain suspended uniformly in the organic liquid phase. The preferential association of hydrophilic mineral matter with water is responsible for the separations achieved by the method of this invention.

The new method has been demonstrated by separating micron sized kaolin clay particles from mixtures of coal and kaolin contained in a water-in-oil emulsion with use of electrostatic demulsification. The efficiency of separation is highly dependent on the choice of emulsifiers. Under conditions resulting in the most efficient separation, greater than 95% rejection of kaolin particles into the separated water phase was achieved with virtually complete recovery of the hydrophobic coal particles in the oil phase. Microscopic observations have shown that kaolin particles are completely water-encased while most coal particles remain dispersed in the oil phase. Under influence of the applied electrostatic field, the coalesced water phase appears as intertwined cylindrical tubes extending between the electrodes.

According to the present invention, it has been discovered that certain new surfactants and combinations of surfactants can be used in the electrostatic coalescence process achieving far superior separation results relative to prior methods. The new surfactants promote formation of water "tubes," as opposed to "chains" of water droplets previously encountered. When the separator electrodes are arranged horizontally, these "tubes" effect improved separation because of their vertical orientations. Once the hydrophilic mineral matter or other particulate species to be separated enters the tubes, there is nothing to support it. Hence, the particles slide down the tube into the water phase and are readily removed. The invention preferably utilizes wire mesh or other open electrode configurations for achieving the novel method of electrostatic coalescence.

In a practical application, this work indicates that coal can be separated into components of differing ash levels with use of the new electrostatic coalescence technique. In addition, other potential applications for the present invention thus may include 1) recovery of bitumen and separation of fine mineral matter in the processing of tar sands; 2) the recovery of kerogen rich shale components in oil-shale beneficiation and the rejection of mineral matter in shale oil dedusting; 3) the dewatering of viscous crude oil produced by steam injection methods; 4) selective recovery of catalysts for recycle in petroleum refining or in chemical processing; 5) recovery of diamonds used in optical polishing applications.

BRIEF DESCRIPTION OF THE DRAWINGS

FIGS. 6 i-iv are photomicrographs which demonstrate novel "tube" effects produced by a preferred emulsifier of the present invention on electrostatic coalescence of water-in-oil emulsions with and without the presence of solid particles.

FIGS. 7 i-iv are photomicrographs which demonstrate "chaining" effects produced by a second emulsifier of the present invention in electrostatic coalescence of water-in-oil emulsions with and without the presence of solid particles.

DETAILED DESCRIPTION OF THE INVENTION

Figure 1:
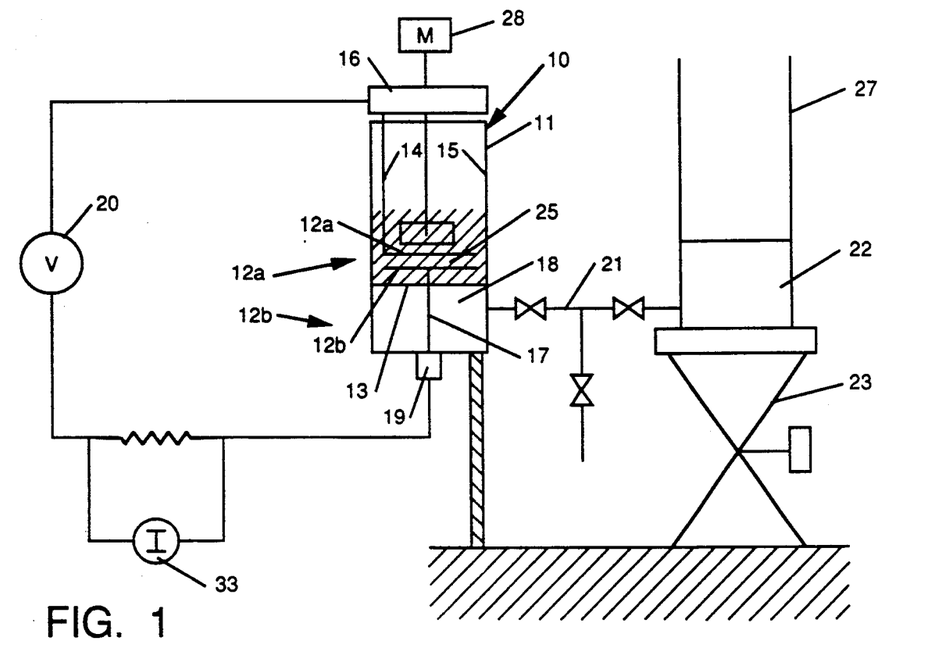
FIG. 1 illustrates a preferred electrostatic coalescer for use in practicing a preferred embodiment of the present invention.

The present invention comprises a method for separating hydrophilic particulates from liquid streams. In a preferred embodiment of the invention, the hydrophilic particulates are separated from hydrophobic particulates. A preferred method of the present invention includes the steps of mixing the hydrophilic and hydrophobic particulates in an emulsion of water and an organic liquid. The emulsion preferably includes an emulsifier (also know as a surfactant). The emulsion is preferably placed in an electrostatic separator, 10, such as that shown in FIG. 1. As illustrated in FIG. 1, the emulsion, generally 25, is added to the separator 10 adjacent a layer of a primarily water phase 18 so as to create a water/emulsion interface 13. As illustrated, at least a portion of the emulsion 25 is located between an upper and lower electrode, 12a and 12b, respectively. As illustrated, the upper and lower electrodes 12a and 12b are positioned in a spaced-apart relationship and are substantially parallel to one another. Also as illustrated, the water/emulsion interface 13 is desirably positioned below the lower electrode 12b and in relatively close proximity thereto. The distance between the water/emulsion interface and the bottom surface of the lower electrode 12(b) is preferably no more than about 5 mm. This water/emulsion interface is preferably maintained at a constant level with respect to the lower electrode 12b throughout operation of the electrostatic separator 10.

Figure 6:
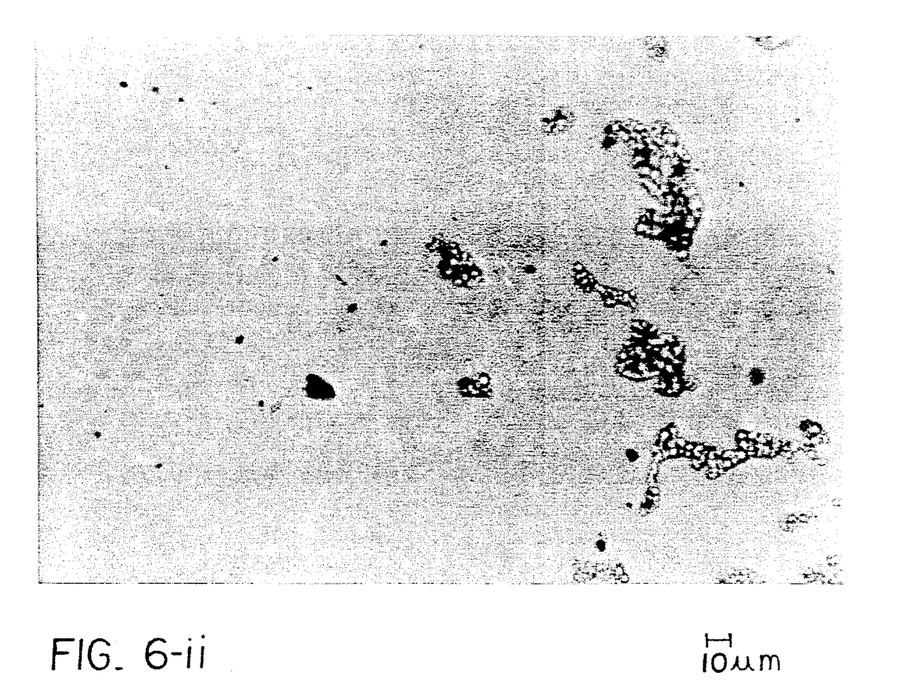

After the appropriate level of the water/emulsion interface is achieved, the electrostatic coalescing operation begins by establishing an electric field between the electrodes 12a and 12b. The electrostatic field coalesces at least a portion of the water in the emulsion, forming substantially tubular sections of coalesced water, as depicted in FIGS. 6-iii and 6-iv. These substantially tubular sections extend substantially vertically between the electrodes 12a and 12b. Because the hydrophilic particulates are attracted to water, at least a portion of the hydrophilic particulates to be separated become encased in these tubular water sections, while the hydrophobic particulates remain substantially uniformly distributed and suspended outside and away from the tubular water sections in the organic liquid.

As the hydrophilic particulates become encased in the tubular sections, gravitational forces acting on the particulates allow them to settle, passing through the tubular water sections and across the water/emulsion interface 13 and into the primarily water phase 18 where they settle and agglomerate. From here the hydrophilic particulates may be collected for disposal or other use. After the hydrophilic particulates are removed from the emulsion phase 25, the suspended hydrophobic particulates may be extracted from the organic liquid phase using known methods.

In a preferred embodiment of the invention, the emulsifier comprises a general type emulsifier or a mixture of emulsifiers which are non-ionic ABA-type block copolymers containing ethylene oxide, wherein A is castor oil, and B is nonyl phenol. In a most preferred embodiment of the invention, the emulsifier includes a first component, a second component and a third component, wherein the first component is HYPERMER B246, the second component is T-DET N1.5, and the third component is T-DET N4. In a most preferred embodiment of the invention the first, second and third components are present in the emulsion in a ratio ranging from between 33/33/33 to 50/25/25, respectively.

In another preferred embodiment of the invention the emulsifier comprises a general type emulsifier or a mixture of emulsifiers which are non-ionic mixtures of sorbitan mono-oleate, nonyl phonol and ethylene oxide. In a most preferred embodiment of the invention, the emulsifier includes a first component, a second component and a third component, wherein the first component is SPAN 80, the second component is T-DET N1.5, and the third component is T-DET N4. In a most preferred embodiment of the invention the first, second and third components are present in the emulsion in a ratio ranging from between 33/33/33 to 50/25/25, respectively.

With use of the above described emulsifier, stable emulsions can be prepared which contain high levels of particulates. Further, significant separations of these particulates into hydrophilic and hydrophobic components can be achieved when the above described emulsion is broken using electrostatic methods. The mechanism of coalescence for this emulsifier involves Type I behavior consisting of chains of water droplets extending between electrodes.

Preferably, the electric field used in the present invention is produced using wire mesh electrodes. The water/emulsion interface is preferably maintained at a constant level with respect to the lower electrode 12b, for example, by raising and lowering if necessary, the level of a water vessel 27 external to the separator 10 but connected to the primarily water phase 18 in the separator 10 via a flow path device as illustrated in FIG. 1.

The electric field employed by the present invention can be either an AC electric field or a DC electric field. When an AC field is employed, preferably the field between the electrodes is between 900 and 2,000 volts RMS per centimeter, and the frequency is preferably 60 Hertz.

When a DC field is employed, the electric field between the electrodes is preferably between 800 and 1,000 volts DC per centimeter. Preferably a mixer 28 is employed to continually stir the emulsion phase 25, and this mixer preferably operates at between 0 and 500 RPM.

In operation, preferably the coalescing operation occurs over a period of between 10 and 20 minutes. The temperature in the electrostatic separator 10 is preferably maintained at between 20 and 100 degrees Centigrade.

In a preferred embodiment of the invention, the organic liquid comprises mineral oil. However, light oil, heavy oil, motor oil and motor oil/kerosene mixtures have also been tried and have performed acceptably. Other organic liquids could work as well. For example, crude oil and other refined oils would be acceptable. Further, coal derived hydrocarbon liquids and shale oil could also be used.

When the organic liquid comprises mineral oil, the liquid preferably has a viscosity of between 40 and 140 Centipoise. On the other hand, when the organic liquid comprises refined oil or a mixture of oil in kerosene, the viscosity is preferably between 40 and 300 Centipoise.

According to a preferred embodiment of the invention, the concentration of the emulsifier ranges from 0.4 to 1.5 weight percent based on the weight of the emulsion 25. The concentration of the particulates preferably ranges from 0 to 40 weight percent based on the weight of the emulsion. The concentration of the water component in the emulsion preferably ranges from 0 to 30 weight percent based on the weight of the emulsion 25. Preferably, the concentration of the organic liquid component of the emulsion ranges from 50 to 90 weight percent based on weight of emulsion 25.

In a preferred embodiment of the invention, the hydrophilic particulates comprise mineral matter and the hydrophobic particulates comprise micronized coal, the particle sizes of coal ranging up to about 60 mesh. In this case, the electrostatic separator is used to produce coal of low ash and low sulfur by separation of the mineral matter from the micronized coal according to the disclosed method. In a typical situation, the micronized coal including the hydrophilic particulates is received in a fuel oil slurry prior to being emulsified in order to produce the low ash and low sulfur coal, which is recovered as a coal/fuel oil slurry.

In another preferred embodiment of the invention, high viscosity crude oil makes up the organic liquid and the crude oil is dewatered by the method of the present invention, the water being removed by formation of the coalesced water tubes. In this situation, the crude oil may or may not contain hydrophobic particulates, and the water entrained in the crude oil comprises the hydrophilic particulates. Thus, the tubes formed using the method of the present invention themselves may be allowed to settle through the water/emulsion interface, thereby ridding most of the water from the crude oil. Such crude oil, containing water, is frequently encountered in crude oil produced by steam injection.

In another preferred embodiment of the invention, the hydrophobic particulates comprise bitumen and the hydrophilic particulates comprise fine mineral refuse and the bitumen is recovered and fine mineral refuse is rejected in processing tar sands according to the disclosed method.

In yet another preferred embodiment of the invention, the hydrophobic particulates comprise kerogen rich shale components and the hydrophilic particulates comprise fine mineral refuse, and kerogen rich shale components are recovered and the fine mineral refuse is rejected in processing oil shale.

In yet another preferred embodiment of the invention, the hydrophilic particulates comprise fine mineral refuse which is rejected in processing of shale oil.

In yet another preferred embodiment of the invention, the hydrophilic particulates comprise a catalyst, which catalyst is recovered for recycling in petroleum refining.

Hydrophobic coal of very low ash and hydrophilic kaolin samples were used as model components in the following experiments.

EXPERIMENTAL

Two coals were used to simulate hydrophobic materials. One coal was a Lower Kittanning Coal (C1), which is characterized by 6.5% ash and 4% sulfur. The other coal used was Blue Gem Seam coal from Eastern Kentucky, having less than 2% ash and 0.7% sulfur (C2). Both coals (C1 and C2) were micronized by grinding in water for 180 minutes in a stainless steel jar mill employing 3/16 inch stainless steel media. Raw kaolin clay with 86.5% ash and (K1) was obtained from the J. M. Huber Corporation and was used to simulate hydrophilic material. It was dry ground to pass a −400 mesh screen. The particle size distributions of these model components were determined using a Leeds & Northrup Microtrac Particle Size Analyzer and are compared in Table I.

TABLE I

Particle Size Distribution of Model Components (Microns)

| | Percentile | | | |
|---|---|---|---|---|
| | % 10 | % 50 | % 90 | Mass Mean |
| Lower Kittanning | (C1) 1.5 | 3.7 | 11.0 | 5.2 |
| Blue Gem | (C2) 1.5 | 3.7 | 8.4 | 4.4 |
| Kaolin Clay | (K1) 1.4 | 3.2 | 11.0 | 4.8 |

Distilled water and light mineral oil with Saybolt universal viscosity 130 (viscosity ~40 cp) were used throughout this work. The emulsifiers used were supplied by ICI Americas, Inc., Du Pont, Thompson-Hayward, Akzo Chemie America, Nalco, and BASF.

Combinations of at least 30 emulsifiers having HLB values of 1 to 9 were tested for emulsion stability. Emulsifiers that were determined to be able to maintain stable solid-water-oil emulsions are listed in Table II.

TABLE II

List of Emulsifiers with Calculated HLB Values

| Name* | Emulsifier Combination Ratio by Weight | HLB |
|---|---|---|
| A | SPAN 80/T-DET N 1.5/T-DET N4 = 2/1/1 | 4.75 |
| E | SPAN 80/SPAN 60 = 1/1 | 4.5 |
| H | HYPERMER B246/SPAN 85/TWEEN 85 = 2/1/1 | 5.95 |
| I | SPAN 80/DUPONOL G = 1/1 | 5.15 |
| J | SPAN 80/T-DET EPO-62 = 1/1 | 4.15 |
| K | HYPERMER B246/T-DET N 1.5/T-DET N4 = 2/1/1 | 5.35 |
| L | SPAN 85/TWEEN 85/T-DET N 1.5/T-DET N4 = 1/1/1/1 | 5.8 |
| N | SPAN 80/SPAN 85/TWEEN 85 = 2/1/1 | 5.35 |
| O | HYPERMER B246/SPAN 8 0/T-DET N 1.5/T-DET N4 = 1/1/1/1 | 5.2 |

*Manufacturing company:
ICI Americas, Wilmington, Delaware 19897: SPAN 60, SPAN 80, SPAN 85, TWEEN 85, HYPERMER B246 Thompson-Hayward, Kansas City, Kansas 66110: T-DET N1.5, T-DET N4, T-DET EPO-62 DuPont, Wilmington, Delaware 19898: DUPONOLG

Emulsion Preparation

Emulsifiers having HLB value below 10 are lipophilic (more oil-soluble than water-soluble). Surfactants of this type were dissolved in mineral oil at designated concentrations. Coal and kaolin were mixed into oil and water respectively using a Tekmar SDT 182EN Tissumizer operating up to 20,000 rpm for one minute. Emulsions of water in oil with particulates were then prepared using these materials in the same way. Such emulsions prepared from the emulsifiers listed in Table II were observed to be stable at room temperature over periods of several hours. The internal phase water droplets were observed to be in the range of 1.5–4.0 μm, with an average size of 3.0 μm.

As used herein, the term "general type" emulsifier means, in the case of emulsifier A, a mixture of sorbitan monleate, nonyl phenol and ethylene oxide, and for emulsifier K, a mixture of castor oil, nonyl phenol and ethylene oxide, formed in an ABA type of block copolymer with an average molecular weight of about 5000.

Electrostatic Coalescence Batch System

The electrostatic coalescence batch system used for the work reported here is illustrated in FIG. 1. The test cell, generally 10, is contained inside a 10 inch tall, 2½ inch diameter plexiglas cylinder 11. Clear plexiglass was employed so that the demulsification process can be viewed in progress. The electrodes 12 are preferably made of 6 mesh size wire screen. As illustrated in FIG. 1, two electrodes, an upper and lower electrode 12a and 12b respectively, were used, being substantially parallel to one another and having a spacing of 5 mm therebetween so as to accommodate an active electrocell volume of approximately 15 cc. The top wire mesh electrode 12a is preferably suspended above the emulsion/water interface 13 with a first suspending means, in this case three metal rods 14 which extend along the side of the wall 15 of the cylinder 11 to the top of a hollow metallic cap 16 which covers the cylinder 11. The bottom wire mesh electrode 12b is preferably supported by a bare metal rod 17 which extends down the receiving water phase 18 to the bottom of a metallic cover 19 at the base of the cylinder 11. Both the cap 16 and the base 19 are connected to a voltage source 20.

About 100 cc of emulsion was loaded into the cylinder for each run. The emulsion/water interface level 13 was adjusted by connecting a flexible hose 21 between the bottom of the receiving water phase 18 and a neighboring water reservoir 22 which may be secured on an adjustable jack 23. The interface 13 will rise during coalescence due to the settling of the coalesced water and hydrophilic solid particulates during the electrostatic breaking of the emulsion. The level of the interface is maintained slightly below the bottom electrode 10 during operation so as to maintain a constant electric field strength. A stirrer 28 is preferably inserted through the cap 16 to create mild agitation in the emulsion phase.

Single phase line voltage was fed to the primary of a 2.2 KVA VARIAC adjustable transformer. The Variac output was fed to a TRIAD PR-21AL plate transformer. Output of the plate transformer, adjustable up to 1200 VRMS, served as the voltage supply for the electrocell. A Broadhead Garrett Model P-52 DC power supply was used for voltages up to 400 VDC. The electrocell input voltage was measured by connecting a digital voltmeter in parallel with the voltage source. The electrocell output current was measured by connecting a resistor in series with the circuit. The voltage across the resistor was recorded by an OmniScrib 5000 strip-chart recorder 33 from Houston Instrument Co. Signals were first converted to DC before input to the strip-chart recorder.

The operating conditions, such as in-feed emulsion composition and concentration, pH of water, emulsion/water interface level, applied voltage and field strength, mixing speed, and operation time, were carefully controlled for each test run.

As emulsion breaking proceeds, the coalesced water generally sinks to the bottom of the cell and passes through the open wire mesh electrodes to the water phase below. Similarly, the light oil fraction, which is released by water coalescence, rises in the cell and is displaced by fresh emulsion from above. Because the open nature of the wire mesh electrodes used permits interchange of the liquid phases, together with the use of mild agitation, the emulsion charged to the cell can be resolved into its liquid components.

The magnitude of the electrical current measured varied to a large extent depending on the operating conditions. However, the onset of electrostatic coalescence can be characterized by highly erratic currents and the termination of coalescence is marked by a smooth return to a quiescent current of a few milliamperes. Upon termination of the operation, the top oil phase was withdrawn through a suction tube operated by a vacuum pump. The oil phase was then diluted with heptane and acetone to enhance filtration of the entrained solids. These solids comprise the hydrophobic product recovered in the oil phase. However, a small portion of the oil phase (less than 10%) that remained above the emulsion/water interface was usually removed and discarded. The remaining water phase was then filtered to recover the hydrophilic portion of the solids. The yield can be obtained from measurement of the mass of the two phases as well as measurements of the ash levels of the solids contained in the oil phase, the water phase and the feed blend. A 5% difference between the results of the two method of determining yield was considered acceptable.

$$\text{Yield (\%)} = \frac{(\text{Refuse Ash} - \text{Feed Ash}) * 100}{(\text{Refuse Ash} - \text{Product Ash})} \quad (1)$$

In order to observe coalescence behavior in the batch operation, an electrocell was mounted on a glass slide for viewing with an Olympus CH trinocular microscope. Photographs were made using a Nikkormate FT-2 camera.

Figure 2:
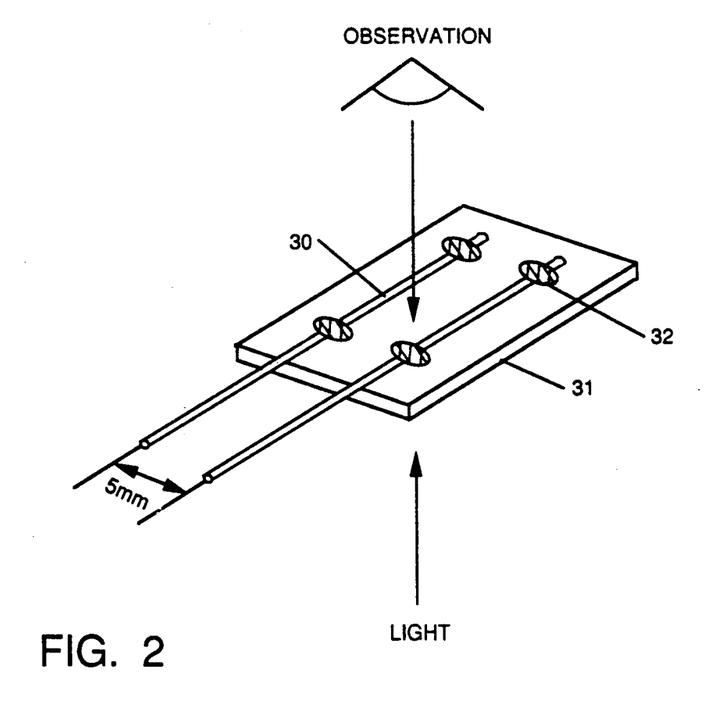
FIG. 2 illustrates an electrostatic coalescence cell mounted on a glass slide for purposes of viewing in a microscope.

The cell, shown in FIG. 2, consisted of two 0.1 mm diameter bare nickel wires 30 laid down 5 mm apart on a glass slide 31. The wires were secured to the surface of the slide by epoxy cement 32 at each end. Power supply leads were connected to the wires several inches away from the microscope state. The electrical current through the emulsion was also measured with use of a digital multimeter. The emulsion was placed on the glass slide surface 31 between and around the nickel wires 30. The emulsion was viewed from above using light transmitted from below.

The electric field strength over the surface of the glass in the space surrounding the electrode wires varies with distance from either wire. Because of this, the microscopic observations were made in an electrocell which was characterized by non-uniform electric fields.

Results

A number of emulsifiers were screened for use in preparing stable emulsions. For purposes of this disclosure, the term "stable emulsions" refers to emulsions which exhibit no settling after standing for one hour Table II presents a list of promising emulsifiers for this use. Emulsifiers A and K were observed to prepare the most stable emulsions. Coalescence of emulsions prepared from Emulsifier A exhibits chaining in an electric field. Emulsifier K exemplifies surfactants which produce a new mode of coalescence which is the basis of the present invention.

First, we measured the efficiency of separation for each emulsifier under fixed operating conditions. A blend of 50/50 coal/kaolin particulates by weight having a feed ash content of about 48% was tested at an electric field strength of 1.2 KVAC/cm. Next, we measured the effects of water concentration, solid concentration and oil type on electrostatic coalescence.

Selection of Emulsifiers

This work demonstrates the action of emulsifiers on the coal/kaolin/water/oil emulsion system. Performance results demonstrating the capability of the present invention to separate the model particulates under an electrostatic field are presented in Table III. A water-phase ash-level near 86.5% indicates nearly all solids in this phase are kaolin particles. An oil-phase ash-level near 6.5% indicates nearly all solids in this phase are coal particles. A perfect separation would result in an oil phase yield of 50%.

As illustrated in the table, use of emulsifier K yields the best overall result. It is also apparent that up to 25% of fine coal/kaolin water slurry can be formed into a stable 28% water-in-light mineral oil emulsion when using 1.6% emulsifier concentration based on oil for each of the emulsifiers. Results achieved with use of emulsifiers A and K are compared to illustrate the advantages of the present invention.

TABLE III

Separation Performance of Various Emulsifiers

Operating Conditions:
1. Lower Kittaning Coal/Kaolin Blend, Feed Ash = 48%,
2. Oil/Water/Solid/emulsifier = 90/25/6/1.5, ratio by weight,
3. 600 VAC at electrode spacing of 5 mm for 26 minutes,
4. Mixing Speed = 60 rpm and pH of water = 4~5.

| Emulsifier | Product Ash, % | Refuse Ash, % | Overall Yield, | Ash Rejection, % |
|---|---|---|---|---|
| A | 29.8 | 86.5 | 67.7 | 58.1 |
| E | 41.2 | 72.2 | 76.8 | 34.3 |
| H | 13.5 | 86.5 | 52.6 | 85.2 |
| I | 41.2 | 49.2 | 20.0 | 82.9 |
| J | 47.0 | 49.0 | 23.0 | 77.6 |
| K | 9.4 | 86.5 | 49.7 | 90.3 |
| L | 15.3 | 50.2 | 6.0 | 98.1 |
| N | 31.7 | 86.5 | 70.0 | 53.9 |
| O | 15.0 | 86.5 | 53.7 | 83.3 |

Mode of Emulsion Preparation

Comparison studies using artificial blends of particulates indicate that the method of wetting the particulates is important. The separation behavior of two emulsion preparation methods were compared. In the first method, the coal and kaolin were wetted by oil and water respectively prior to homogenization (Method A). In the other method a reverse procedure was used (Method B). It can be seen from Table IV that Method A yield better results than Method B.

TABLE IV

Effect of Emulsion Preparation Mode

Operating Conditions:
1. Lower Kittaning Coal/Kaolin Blend, Feed Ash = 48%,
2. 600 VAC at electrode spacing of 5 mm,
3. Mixing Speed = 0 rpm and pH of water = 4~5,
4. Concentration = Oil/Water/Solid/emulsifier, ratio by weight.

| Operating Conditions | Product Ash, % | Overall Yield, % | Ash Rejection % | System |
|---|---|---|---|---|
| Emulsifier A | | | | |
| 90/10/2/1 | 35.7 | 69.4 | 48.5 | A |
| 26 mins. | 41.6 | 77.3 | 33.2 | B |
| Emulsifier K | | | | |
| 90/25/6/1.5 | 8.1 | 51.0 | 91.4 | A |
| 10 mins. | 10.1 | 51.4 | 89.2 | B |

Water Concentration

Figure 3:
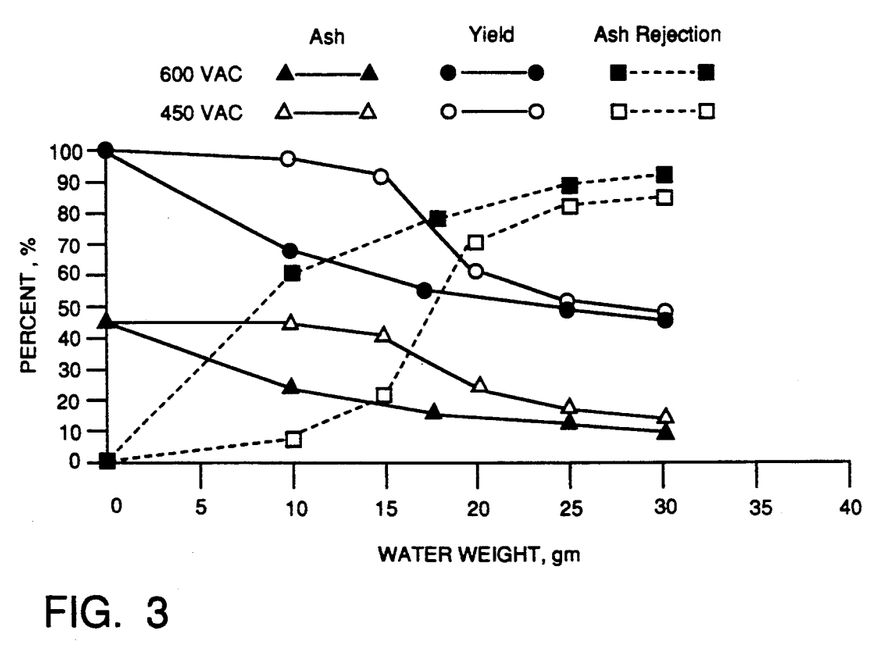
FIG. 3 illustrates the effects of emulsion water content on separations efficiency.
Figure 4A:
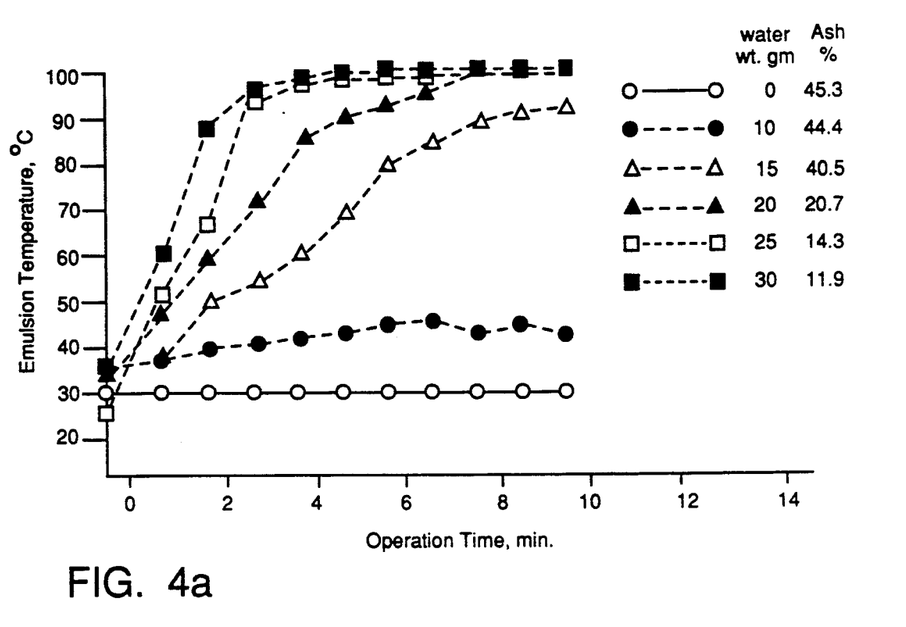
FIG. 4a-b the effects of emulsion water content on the history of electrostatic current and operating cell temperature.
Figure 4B:
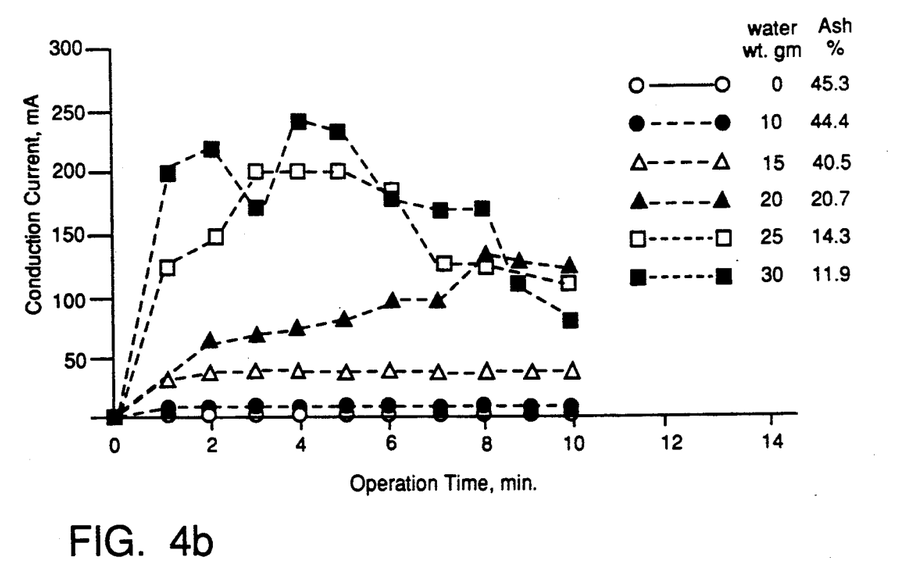
Figure 5A:
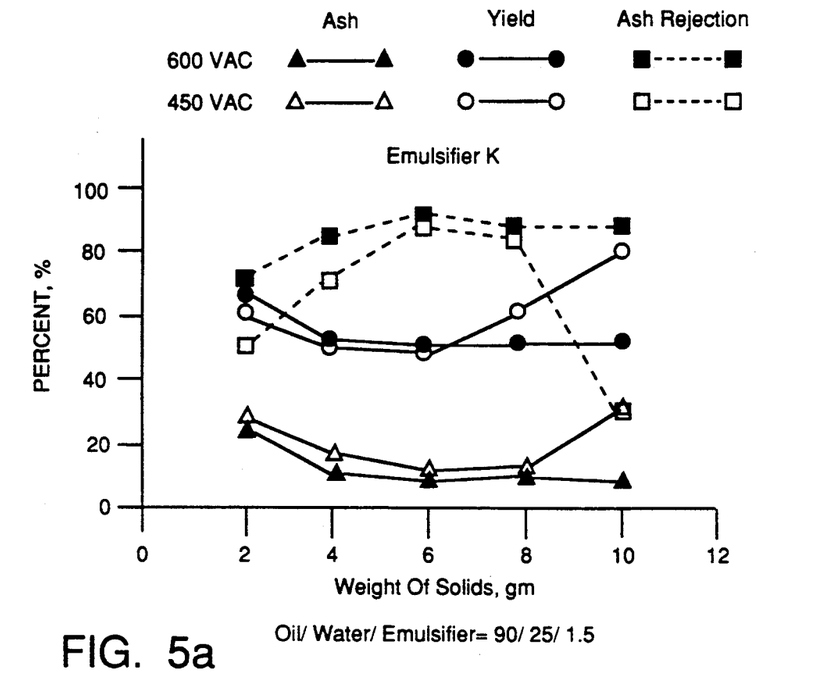
FIG. 5a-b illustrates the effects of solids concentration on the efficiency of separation with two different emulsifiers.
Figure 5B:
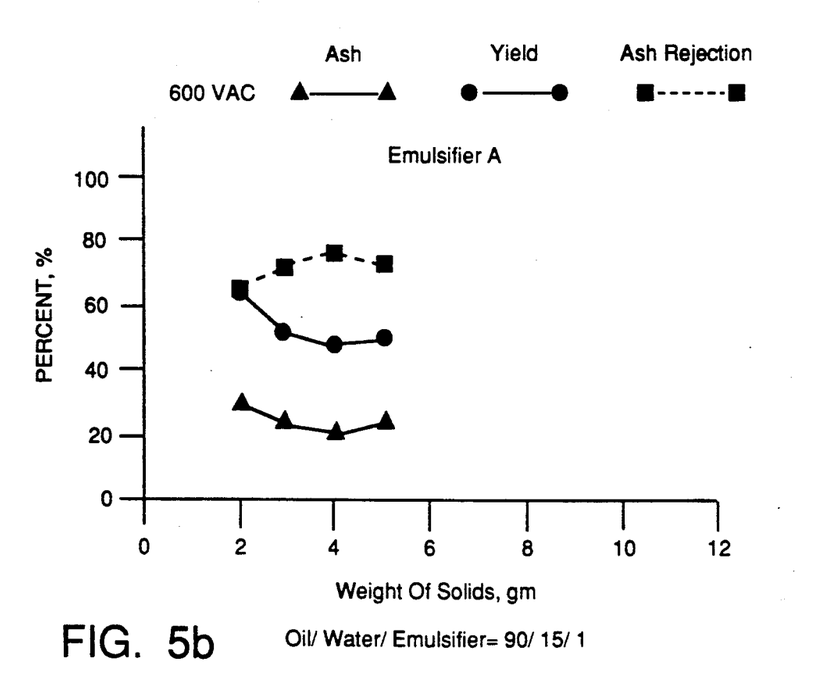

No conduction current and no electrostatic coalescence was detected when a well homogenized oil-coal-kaolin suspension was placed in the electrostatic field. This indicates that water, or some other type of electrical conducting liquid, is essential to this process. The results of a series of experiments studying the effects of water concentration are presented in FIGS. 3 and 4 for the case of emulsifier K. FIG. 3 indicates that the ash level and the overall yield of the oil phase decrease with increasing water content of the emulsion. In addition, for the case where the initial water concentration is 30%, the final water content in the demulsified oil phase, measured by the karl Fisher method, is found to be less than 1.5%. In FIG. 4, the histories of conduction current and temperature profiles at constant electrostatic field are illustrated for emulsions of different water contents. FIG. 4 illustrates a close relationship between the electrostatic coalescence of water droplets and the rise of temperature. The increase in emulsion temperature reduces the interfacial tension of the emulsion and hence further enhances the water coalescence efficiency. It is also observed that the conduction current goes through a pronounced maximum before it levels off and eventually goes to quiescence.

Solids Concentration

Emulsions containing different weights of a 50/50 coal/kaolin blend were prepared using emulsifiers A and K. The performance results are shown in Table 5. In the case of emulsifier K, Blue Gem Seam coal (C2) was used. The emulsion composition had a weight ratio oil/water/emulsifier=90/25/1.5, and two voltage levels (450 and 600 VAC) were tested for 15 minutes. In the case of emulsifier A, Lower Kittanning coal (C1) was used. The emulsion composition had a weight ratio oil/water/emulsifier=90/15/1 and was operated at 600 VAC for 26 minutes. No mixing was applied. Best performance with emulsifier A is indicated at about 4 gms solids for this case at 600 VAC. Solids loading with emulsifier K are greater than that indicated for A. At 450 VAC there is a maximum in solids between 6 and 8 grams. When the voltage is increased to 600 VAC, there is no indicated maximum when using emulsifier K. These results have a direct relationship with the initial amount of water in the emulsion.

Oil Type

Light mineral oil (Saybolt universal viscosity 130) and heavy mineral oil (Saybolt universal viscosity of 343) were also tested. As shown in Table V, for the case of emulsifier A, light mineral oil with lower viscosity yielded better results than did the use of heavy mineral oil. With emulsifier K there is little difference in the efficiency of separation of the particulates from emulsions prepared with use of light and heavy mineral oils. Results achieved with use of emulsifier K were better than those achieved with use of emulsifier A.

TABLE V

| Effect of Oil Type on the Efficiency of Separation | | | |
|---|---|---|---|
| Oil Type | Oil Phase Ash, % | Yield, % | Ash Rejection, % |
| Emulsifier A: | 1. oil/water/solid/emulsifier = 90/15/3/1 | | |
| | 2. 600 VAC for 26 mins. Coal: C1 | | |
| Heavy oil | 39.6 | 73.3 | 39.7 |
| Light oil | 23.6 | 51.8 | 74.6 |
| Emulsifier K: | 1. oil/water/solid/emulsifier = 90/25/6/1.5 | | |
| | 2. 600 VAC for 10 mins. Coal: C2 | | |
| Heavy oil | 11.6 | 55.1 | 85.8 |
| Light oil | 10.2 | 54.1 | 87.8 |

Nature of the Invention

In order to understand the nature of the invention, other factors which might contribute to such an unexpectedly good separation were also investigated. A settling test with no applied electric field was carried out for emulsions prepared with each of the emulsifiers, A and K to check for effects of particle settling. Samples were withdrawn one hour after placement in the cell at 3 positions of equal distance along a vertical axis in the emulsion. The weight concentration and ash content of solids in each sample were measured. The results are presented in Table VI. The elements of this table reveal that with no applied electric field, the emulsions remain very stable with no sign of settling for the water droplets, kaolin or coal particulates. Similarly, tests were carried out in the oil phase after electrostatic separation at 600 VAC. The data show that coal fines are uniformly dispersed in the oil phase. Hence, the possibility of separation based on particulate density can be ruled out.

TABLE VI

Distribution of Solid Particulates in the Emulsion

|  | Emulsifier A | | | | Emulsifier K | | | |
|---|---|---|---|---|---|---|---|---|
|  | V = 0 | | V = 600 VAC | | V = 0 | | V = 600 VAC | |
|  | Ash, % | Wt. % | Ash, % | Wt. % | Ash, % | Wt. % | Ash, % | Wt. % |
| Top | 47.2 | 35.0 | 28.9 | 34.4 | 47.2 | 33.1 | 10.0 | 37.9 |
| Middle | 48.1 | 32.7 | 28.8 | 30.3 | 47.8 | 31.0 | 10.1 | 27.4 |
| Bottom | 48.3 | 32.3 | 32.2 | 35.3 | 47.1 | 35.9 | 14.5 | 34.7 |
| Avg. | 47.9 | 100.0 | 30.0 | 100.0 | 47.4 | 100.0 | 11.6 | 100.0 |

Discussion

Two emulsifiers were found which can be used to form stable emulsions of water in oil and which promote electrostatic separation of particulates. They are designated as emulsifiers A and K. Emulsifier A is a 50/25/25 mixture of three emulsifiers with commercial names as follows: SPAN 80/T-DET N1.5/T-DET N4. It contains a mixture of sorbitan mono-oleate, nonyl phenol and ethylene oxide. The mixture may be varied in a wide range of combinations to form satisfactory emulsions.

Emulsifier K is preferably a 50/25/25 mixture of three emulsifiers with commercial names as follows: HYPERMER B246/T-DET N1.5/T-DET N4. It is composed of an ABA type block copolymer of castor oil, nonyl phenol plus some bonding ethylene oxide molecules in the polymer chain. The mixture is a non-ionic surfactant with the polymer average molecular weight of around 5,000. It is soluble in most organic hydrocarbons and is insoluble in water. A wide range of combination ratios has been tried and stable emulsions can be formed at HLB values between 4 and 6.

We discovered that up to 25% of fine coal/kaolin/water can be blended into a 28% water-in-light-mineral-oil emulsion while maintaining emulsion stability with as little as 1% emulsifier K based on oil. In addition, we discovered that in an electrostatic field, the inclusion of solid particulates in the emulsion does not appreciably change the electrical and coalescence behavior of water droplets.

Under best conditions using emulsifier A, about 60% rejection of kaolin particles was achieved. The separated particles settle in agglomerates at the emulsion/water interface. Some particles pass into the receiving water phase. In sharp contrast, greater than 95% of kaolin agglomerates were found in the water phase with complete coal recovery in the coal-oil suspension when emulsifier K was used. Kaolin agglomerates observed in the receiving water phase range in size from 200 μm to 1 mm.

Particulate density and settling have little, if any, effects on separation. The dielectric constants of the non-conducting particulates investigated are generally less than four, and the dielectric constant of a 28% water-in-mineral oil emulsion is less than ten. Because of these factors, separation by conventional electrostatic means can be ruled out. Additionally, only minor effects were observed where the mixing speed was varied from 0 to 500 rpm. Change in pH of the process water from 3 to 11 had no detectable effect.

To investigate the effects of the hydrophilic particulates, kaolin was replaced with sand. Even then, comparable separation was achieved. Furthermore, it was found that the most efficient separation is achieved when coal is wetted by oil with dissolved emulsifier and kaolin is wetted by water before they are blended together to make the emulsion. It is therefore concluded that matching of particle surfaces with the appropriate liquids and the electrostatic coalescence of water are the two main steps that make this unique separation possible.

In order to confirm this, the behavior of particulates in emulsions formed from emulsifiers A and K were compared in observations made using a microscope.

Figure 6I:
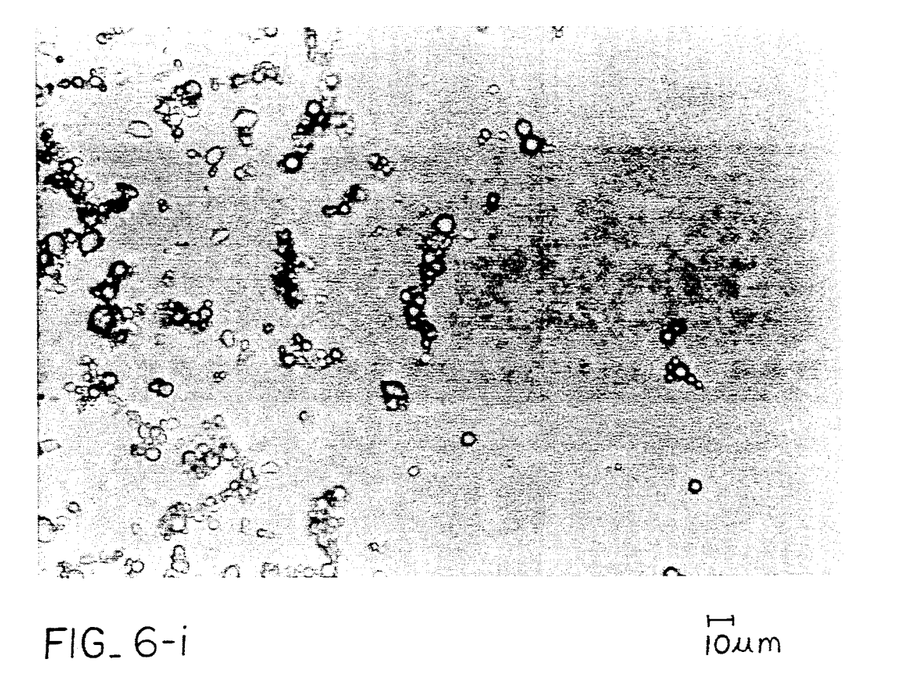

The photomicrographs in FIG. 6-*i* (emulsion without solid) and 6-*ii* (emulsion with coal/kaolin blend) illustrate flocculation with emulsifier K before electrostatic forces are applied. In the absence of solids, the internal water droplets flocculate with an average floc size about 10 to 40 μm. With the addition of kaolin and coal most kaolin fines are attached to water flocs while most coal fines are well dispersed in the oil phase. The separation of coal from kaolin has been initiated, even though no coalescence has yet been achieved.

Electrostatic Coalescence

The coalescence and particulate capture behavior for emulsifiers A and K were observed in the electrostatic fields. They were found to be completely different. The mechanism can best be illustrated through photomicrographs in FIGS. 6-*iii* (emulsion without solid) and 6-*iv* (emulsion with solid). We have observed that while the droplets begin to coalesce through a combined 'Type I' and 'Type II' behavior, they eventually coalesce as intertwined cylindrical tubes extending between electrodes (FIG. 6-*iii*). These tubes have been found to have a diameter of about 30 μm. However, with the addition of blended solids, two interesting new phenomena were discovered (FIG. 6-*iv*). First, we found that fine kaolin particles are completely engulfed into the water tubes and therefore are almost invisible in FIG. 6-*iv*. Since the tubes are extended vertically in the batch cell, this explains the appearance of kaolin agglomerates settling into the receiving water phase. Secondly, we discovered an irregularly shaped layer of surfactant located on the water tube surface. While some fine coal is loosely attached to the aggregates, most is well dispersed in the clear oil phase. It is noted that the attached coal fines will not settle with the heavy water tubes.

Figure 7:
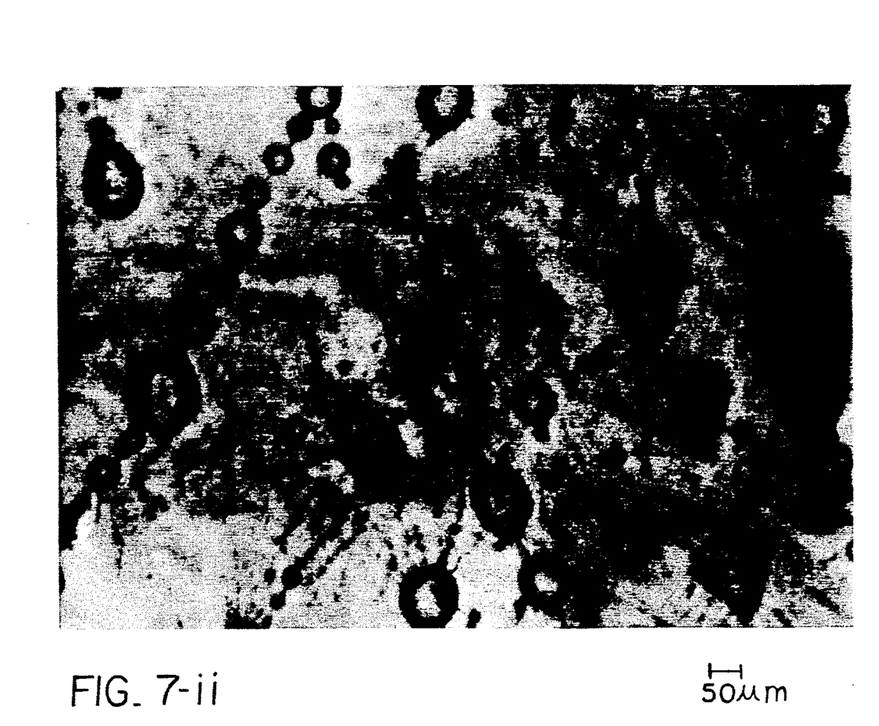
Figure 7I:
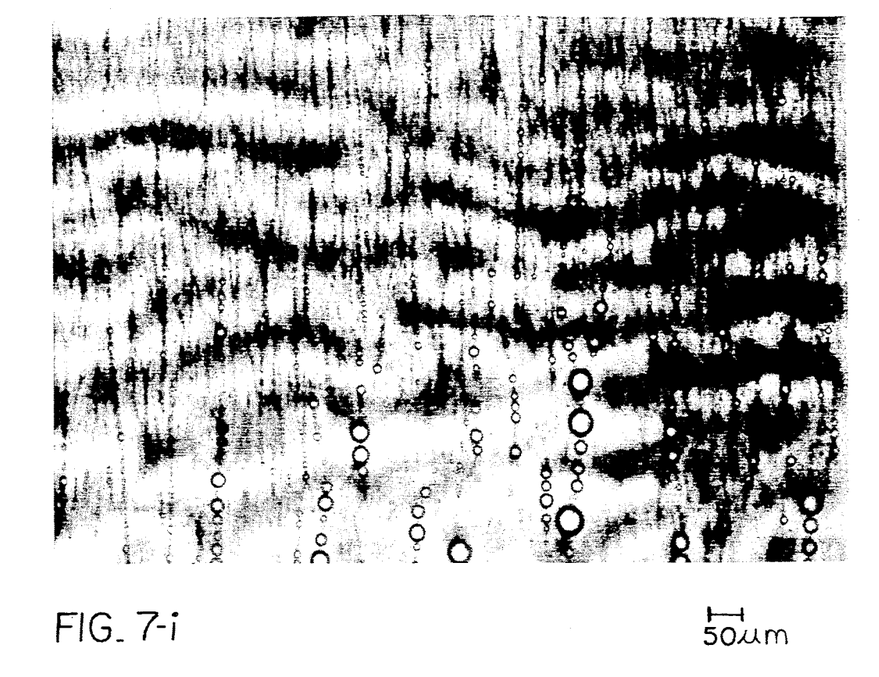

By contrast, the more conventional demulsification mechanism observed with use of emulsifier A, which gives about 65 percent kaolin rejection from coal/kaolin blend emulsion, is significantly different from that of K. Effects of emulsifier A in an electrostatic field are illustrated in the photomicrographs of FIGS. 7-*i* to 7-*iv*. FIG. 7-*i* shows that in the absence of solid blend the droplets coalesce in a 'Type I behavior' with numerous parallel chains forming across the electrodes. This state has been extensively reported by others. FIG. 7-*ii* illustrates electrostatic coalescence of the emulsion that contains kaolin fines only. We observed that even though no water tubes exist, most kaolin particulates are encased in the coalesced water droplets and therefore are not visible in the figure. FIG. 7-*iii* illustrates coalescence of an emulsion containing coal fines only. Unlike the previous case, only very few coal particulates remain dispersed in the oil phase and most of the coal fines were found to congregate between the water droplets along the chains. This suggests a dielectric capture mechanism of fine coal particles. Because of this interference, the water droplets can not coalesce easily to form larger droplets. This is even more evident in FIG. 7-*iv* where both coal and kaolin particles are present in the emulsion. These dielectric captured coal fines prevent coalescence of the kaolin encased water droplets and prevent their removal by settling. This accounts for the entrapment of the kaolin fines in the oil continuum.

By means of our unexpected discovery, we have shown that micron sized particles of differing surface characteristics can be separated with use of electrostatic demulsification methods. Further, with proper choice of surfactant, a tubular state of coalesced water can be established which extends vertically between the separator electrodes. Additionally, the hydrophilic particulates can be engulfed inside the water tubes. Thus both coalesced water and hydrophilic particulates can be separated efficiently by sedimentation. The hydrophobic particles remain suspended in the organic liquid phase. This forms the basis of a new method of particle separation.

We claim:

1. A method for separating hydrophilic particulates from hydrophobic particulates, said method including the steps of:
   a. mixing said hydrophilic and hydrophobic particulates in an emulsion of water and an organic liquid, said emulsion including an emulsifier;
   b. placing the emulsion in an electrostatic separator adjacent a layer of a primarily water phase so as to create a water/emulsion interface, at least a portion of said emulsion being located between an upper and lower electrode, said upper and lower electrodes being spaced apart and being substantially parallel to one another, said interface lying below and in close proximity to said lower electrode;
   c. coalescing at least a portion of said water in said emulsion by passing an electric field between said electrodes, said coalesced water forming substantially tubular sections extending substantially vertically between the electrodes, with at least a portion of said hydrophilic particulates being encased in said tubular sections, said hydrophobic particulates remaining substantially uniformly distributed and suspended in said organic liquid;
   d. removing said hydrophilic particulates from said coalesced water through settling, whereby said hydrophilic particulates pass through said tubular sections and cross said water/emulsion interface and settle in agglomerates in said primarily water phase.

2. The method of claim 1 wherein said emulsifier is a general type emulsifier.

3. The method of claim 2 wherein said emulsifier includes a first component, a second component, and a third component wherein the first component is HYPERMER B246, said second component is T-DET N1.5, and said third component is T-DET N4.

4. The method of claim 3 wherein said first, second, and third components are present in said emulsifier in a ratio ranging from between 33/33/33 to 50/25/25, respectively.

5. The method of claim 1 wherein said electric field is produced using wire mesh electrodes.

6. The method of claim 1 wherein said water/emulsion interface in the electrostatic separator is maintained at a constant level with respect to said lower electrode.

7. The method of claim 6 wherein the water/emulsion interface level in the electrostatic separator is maintained by raising and lowering the level of a water vessel external to the separator but connected to the primarily water phase in the separator via a flow path.

8. The method of claim 1 wherein said electric field is an AC electric field.

9. The method of claim 8 wherein said electric field between the electrodes is between 900 to 2000 volts RMS per centimeter.

10. The method of claim 9 wherein the frequency of the AC electric field is 60 Hertz.

11. The method of claim 1 wherein said electric field is a DC electric field.

12. The method of claim 11 wherein the electric field between the electrodes is between 800 to 1000 volts DC per centimeter.

13. The method of claim 1 wherein a mixer is employed in the emulsion which operates between 0 and 500 RPM.

14. The method of claim 1 wherein said emulsion has a pH of between 3 and 11.

15. The method of claim 1 wherein said coalescing occurs over a period of between 10 and 20 minutes.

16. The method of claim 1 wherein said organic liquid comprises mineral oil.

17. The method of claim 16 wherein said mineral oil has a viscosity between 40 and 140 centipoise.

18. The method of claim 1 wherein said organic liquid comprises refined oils.

19. The method of claim 18 wherein said refined oil has a viscosity between 40 and 300 centipoise.

20. The method of claim 1 wherein the temperature in the electrostatic separator is maintained between 20 degrees Centigrade and 100 degrees Centigrade.

21. The method of claim 1 wherein the concentration of the emulsifier ranges from 0.4 to 1.5 weight percent based on emulsion.

22. The method of claim 1 wherein the concentration of the particulates ranges from 0 to 40 weight percent based on emulsion.

23. The method of claim 1 wherein the concentration of water in said emulsion ranges from 0 to 30 weight percent based on emulsion.

24. The method of claim 1 wherein the concentration of organic liquid in said emulsion ranges from 50 to 90 weight percent based on emulsion.

25. The method of claim 1 wherein said hydrophilic particulates comprise mineral matter and said hydrophobic particulates comprise micronized coal, and said electrostatic separator is used to produce coal of low ash and low sulfur by separation of said mineral matter from said micronized coal.

26. The method of claim 25 wherein said mineral matter and micronized coal are dispersed in a fuel oil slurry and a mixture of low ash and low sulfur coal with oil is prepared from micronized coal and fuel oil.

27. The method of claim 1 wherein said organic liquid comprises high viscosity crude oil which need not contain hydrophobic particulates, and the hydrophilic particulates comprise water droplets and said crude oil is dewatered by said method.

28. The method of claim 27 wherein the high viscosity crude oil is produced by steam injection.

29. The method of claim 1 wherein said hydrophobic particulates comprise bitumen and said hydrophilic particulates comprise fine mineral refuse, wherein said bitumen is recovered and said fine mineral refuse is rejected in processing of tar sands.

30. The method of claim 1 wherein said hydrophobic particulates comprise kerogen rich shale components and said hydrophilic particulates comprise fine mineral refuse, wherein said kerogen rich shale components are recovered and said fine mineral refuse is rejected in processing of oil shale.

31. The method of claim 1 wherein said hydrophilic particulates comprise a catalyst, which catalyst is recovered for recycle in petroleum refining.

32. The method of claim 1 wherein said hydrophilic and hydrophobic particulates are no greater than 60 mesh.

33. The method of claim 1 wherein said emulsifier is a mixture of emulsifiers which are non-ionic ABA type block co-polymers containing ethylene oxide, where A is castor oil, and B is nonyl phenol.

34. The method of claim 1 wherein said organic liquid comprises mixtures of refined oil and kerosene.

35. The method of claim 34 wherein said mixtures of refined oil and kerosene have a viscosity between 40 and 300 centipoise.

36. A method for separating hydrophilic particulates from an emulsion, wherein said emulsion has a continuous organic liquid phase, said emulsion including an emulsifier, said method including the steps of:

a. placing said emulsion in an electrostatic separator adjacent a layer of a primarily water phase so as to create a water/emulsion interface, at least a portion of said emulsion being located between an upper and lower electrode, said upper and lower electrodes being spaced apart and being substantially parallel to one another, said interface lying below and in close proximity to said lower electrode;

b. coalescing at least a portion of said water in said emulsion by passing an electric field between said electrodes, said coalesced water extending substantially vertically between said electrodes, with at least a portion of said hydophilic particulates being encased in said coalesced water;

c. removing said hydrophilic particulates from said coalesced water through settling, whereby said encased hydrophilic particulates settle through said water/emulsion interface to said primarily water phase.

37. The method claim 36 wherein said emulsifier is emulsifier A.

38. The method of claim 37 wherein said emulsion includes up to 40% hydrophilic particulate solids by weight based on weight of the emulsion, and 95% of said solids are separated from said emulsion through said settling.

39. The method of claim 36 wherein said emulsifier is emulsifier K.

40. The method of claim 36 wherein said continuous organic liquid phase is crude oil and said hydrophilic particulates comprise water.

* * * * *